W. C. NYE.
POT COVER.
APPLICATION FILED JAN. 12, 1914.
1,129,115.  Patented Feb. 23, 1915.
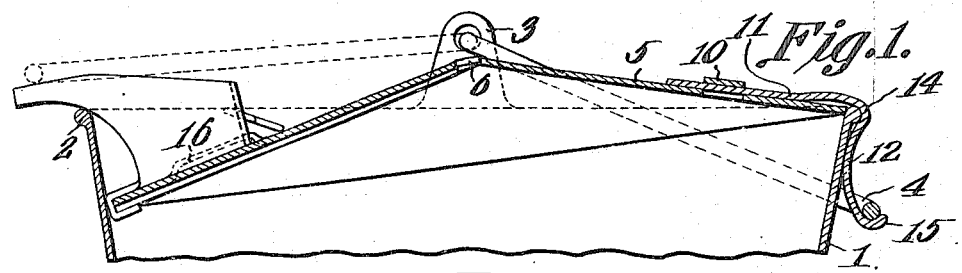
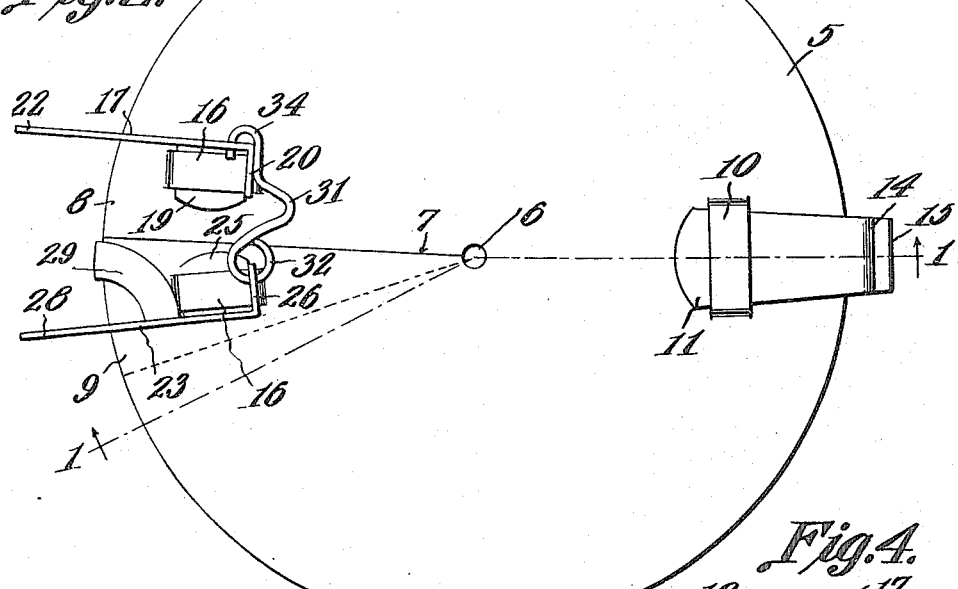
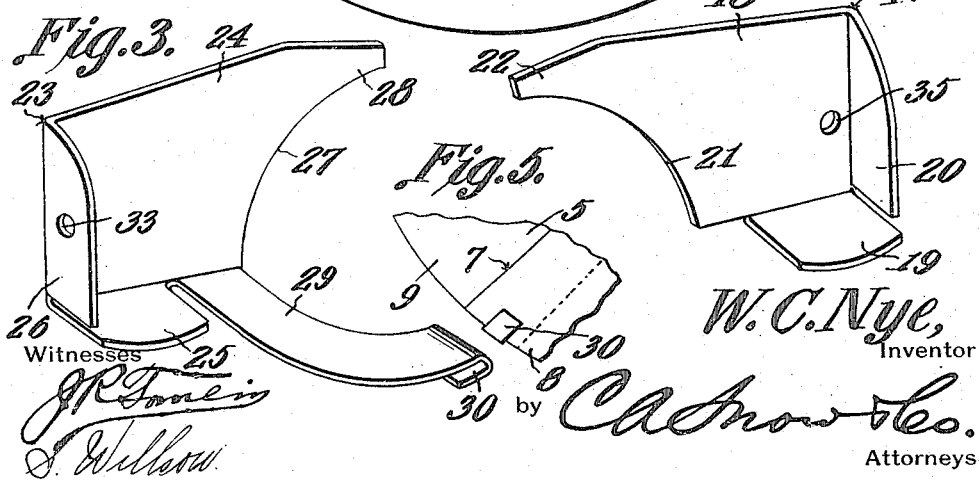
W. C. Nye,
Inventor
Witnesses
by
Attorneys

UNITED STATES PATENT OFFICE.

WILLIAM C. NYE, OF DALLAS, TEXAS.

POT-COVER.

1,129,115.  Specification of Letters Patent.  Patented Feb. 23, 1915.

Application filed January 12, 1914. Serial No. 811,699.

*To all whom it may concern:*

Be it known that I, WILLIAM C. NYE, a citizen of the United States, residing at Dallas, in the county of Dallas and State of Texas, have invented a new and useful Pot-Cover, of which the following is a specification.

The device forming the subject matter of this application is an expansible and contractible cover adapted to be assembled with a utensil of any desired sort.

One object of the present invention is to provide a cover of the sort described which may be knocked down readily for shipment, the cover being so constructed that the constituent parts thereof may be assembled readily without the use of tools.

Another object of the invention is to provide novel means for securing a contraction of the cover and for holding the relatively movable parts of the cover against relative movement.

It is within the scope of the invention to provide novel means for connecting the peripheries of the parts of the cover slidably for a relative movement, and specifically, to equip one of the handles of the cover with a guide which accomplishes this end.

It is within the spirit of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—Figure 1 is a vertical sectional view showing the cover constituting the present invention applied to a utensil; Fig. 2 is a top plan of the cover; Fig. 3 is a perspective of one handle; Fig. 4 is a perspective of the other handle; Fig. 5 is a fragmental bottom plan of the cover.

In the drawings, the numeral 1 indicates a pot and the word "pot" will be used in this specification as indicating a vessel of any desired sort and construction which is adapted to receive a cover of the type hereinafter described. The pot 1 may or may not be provided with a bead 2 and in some cases the pot will be equipped with ears 3 supporting a pivotally mounted bail 4.

The cover constituting the subject matter of the present invention comprises a body 5 ordinarily fashioned from resilient metal and of approximately circular contour. At its center or elsewhere, the body 5 of the cover is equipped with a perforation 6 constituting a steam outlet. The body 5 is slit radially as indicated at 7 to form overlapped, relatively movable parts 8 and 9. The body portion 5 of the cover ordinarily is made and shipped in a flat condition, but its parts 8 and 9 may be overlapped so as to dispose the body 5 in a conical form as clearly shown in Fig. 1.

From the body 5 of the cover a strap-like keeper 10 is struck, the keeper 10 ordinarily being opposite to the slit 7. The invention includes a latch 11 which is inserted beneath the keeper 10, the latch terminating at its outer end in a depending, resilient tongue 12 which may be formed with a seat 14 adapted to coöperate with the bead 2 on the pot 1 as shown at the right hand side of Fig. 1. The lower end of the tongue 12 is curved outwardly to form a finger 15 which is adapted to serve as a support for the bail 4 of the pot 1, and by properly shaping the finger 15, the bail 4 may constitute a means for holding the seat 14 engaged with the bead 2.

Strap-like keepers 16 are struck from the parts 8 and 9 of the body 5, the keepers 16 preferably standing approximately at right angles to the keeper 10.

The invention contemplates the use of a pair of detachable handles, one handle being shown in Fig. 4 and being denoted generally by the numeral 17. The handle 17 comprises a plate-like body 18 equipped along its lower edge with a rectangularly disposed extension 19 which is adapted to be inserted beneath the keeper 16 on the part 8, as will be understood from Fig. 2. Projecting from the body 18 of the handle 17 and located at right angles to the body 18 and the extension 19 is a bracing wing 20, the lower edge of which is adapted to bear upon the upper face of the end 8 of the body portion of the cover, so as to steady the handle 17. The lower edge of the body portion of the handle 17 is concaved as indicated at 21, so as to coöperate properly with the upper edge of the pot 1, as shown at the left hand side of Fig. 1. The extremity 22 of the body portion 18 of the handle 17 projects beyond the periphery of the body 5 of the cover, so that when the cover is contracted and is located within the periphery of the pot 1, the extremity 22 may aid in supporting the cover.

A handle 23, shown in Fig. 3, is provided, the handle including a body 24, an extension 25, and a bracing wing 26, the body 24 being concaved as at 27 and the extremity 28 of the body portion of the handle being prolonged beyond the periphery of the body portion 5 of the cover as hereinbefore explained in connection with the handle 17. The body portion 24 of the handle 23, however, is equipped with a curved arm 29 terminating at its outer end in a hook-shaped guide 30. This guide 30 extends across the edges of the parts 8 and 9 of the body portion of the cover and is prolonged beneath the part 8, as Fig. 5 will clearly show. The function of the guide 30 is to maintain the parts 8 and 9 in close lateral proximity to each other, as the parts have relative movement when the handles 17 and 23 are pinched together.

A locking device 31, the function of which is to limit the relative movement of the parts 8 and 9 of the body 5 of the cover is shown. The locking device 31 is provided at one end with an eye 32 which is pivotally mounted in an opening 33 formed in the bracing wing 26 of the handle 23. At the opposite end of the locking device 31 there is formed a hook 34 which is adapted to be engaged in an opening 35 formed in the body 18 of the handle 17. At this point it may be noted that the locking device 31 exercises two functions. First, it prevents the body portion 5 of the cover from expanding; and secondly, it serves to maintain the extensions 19 and 25 of the handles interlocked with the keepers 16. If the sides of the pot 1 are vertical or nearly so, the hook 34 of the locking device may be detached from the handle 17 but when, as shown in Fig. 1, the pot 1 has sloping sides, the locking device 31 may be arranged as shown in Fig. 2 so as to prevent the cover from jumping out of the pot due to the resiliency of the body portion 5 of the cover.

The operation of the structure need be described but briefly, it being understood that in order to accommodate the cover to pots of different sizes, the handles 17 and 28 are pinched together, causing the parts 8 and 9 of the body portion 5 of the cover to slide upon each other, thereby accommodating the cover to the diameter of the pot. The locking device 31 may or may not be hooked up with the handle 17, as is deemed expedient. The latch 11 and the handles 17 and 24 extend beyond the periphery of the body portion 5 of the cover and form a multi-point support for the cover thereby to prevent a tilting thereof when the body 5 is in a contracted condition and within the contour of the pot as shown in Fig. 1.

If desired, the bail 4 instead of being disposed as shown in Fig. 1, may be swung over to the left and be supported upon the handles 23 and 17. When this operation is resorted to, the handle 4 of the pot 1 will tend to conduct away heat from the handles 23 and 17 to some extent, thereby keeping these elements comparatively cool.

Attention is directed to the fact that the entire structure may be set up and taken down without the use of tools.

Having thus described the invention, what is claimed is:—

1. A pot cover comprising an expansible body including relatively movable parts; a handle on one part; the other part being provided with a keeper; and a second handle comprising a plate provided along its lower edge with an extension engaged with the keeper, one end of the plate being bent to form a body engaging brace disposed at an angle to the plate.

2. A pot cover comprising an expansible body including relatively movable parts, one part being provided with a handle and the other part being provided with a keeper; and a handle including an extension engaging the keeper, a laterally extended bracing wing engaging the body, and a guide engaging the peripheries of both parts.

3. A pot cover comprising an expansible body including relatively movable parts, one part having a handle and the other part being provided with a keeper; and a handle fashioned from a plate of metal, the lower edge of which is equipped with an extension engaging the keeper and with a guide engaging the peripheries of both parts, one part of the plate being bent to form an angularly disposed bracing wing.

In testimony that I claim the foregoing as my own, I have hereto affixed my signature in the presence of two witnesses.

WILLIAM C. NYE.

Witnesses:
B. F. WORD,
T. S. LAWHOW.

Copies of this patent may be obtained for five cents each, by addressing the "Commissioner of Patents, Washington, D. C."